Z. DAVIS,
Assignor to G. E. HERRICK.
VAPOR STOVE.
No. 10,355. Reissued July 10, 1883.
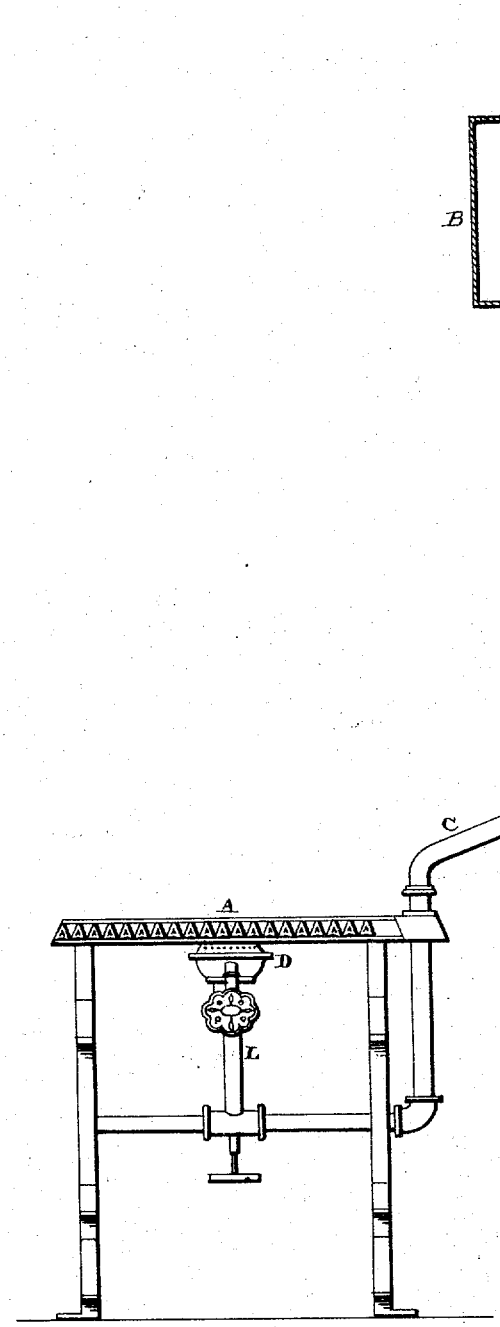
Witnesses.
Louis F. Gardner
J. W. Garner
Inventor.
Zebulon Davis,
per
F. A. Lehmann, Att'y.

UNITED STATES PATENT OFFICE.

ZEBULON DAVIS, OF CANTON, ASSIGNOR TO GAMALIEL E. HERRICK, OF CLEVELAND, OHIO.

VAPOR-STOVE.

SPECIFICATION forming part of Reissued Letters Patent No. 10,355, dated July 10, 1883.

Original No. 267,334, dated November 14, 1882. Application for reissue filed December 30, 1882.

*To all whom it may concern:*

Be it known that I, ZEBULON DAVIS, a citizen of the United States, residing at Canton, in the county of Stark and State of Ohio, have invented certain new and useful Improvements in Vapor-Stoves, of which the following is a specification, reference being had therein to the accompanying drawing.

My invention relates to an improvement in vapor-burners; and it consists, first, in the combination of the reservoir, a cylinder, a tightly-fitting piston, and the supply-pipe which connects the reservoir and the burners, whereby a vacuum is caused in the supply-pipe for the purpose of drawing the oil forcibly away from the burners, and thus extinguish the flames; second, in the combination of the reservoir, the cover thereof, a piston, a cylinder, and a supply-pipe which connects the reservoir and the burners, the piston and the cover of the reservoir being connected together in such a manner that when the cover is removed the piston is drawn upward, so as to draw the oil away from the burners and instantly extinguish the flames before the reservoir can be filled.

The object of my invention is to connect the cover of the reservoir with a piston, so that when the cover of the reservoir is removed for the purpose of filling the reservoir the flames will be instantly extinguished for the purpose of preventing an explosion, and thus leave nothing to the memory or the judgment of the person who has to fill the reservoir.

The accompanying drawing represents a side elevation of a vapor-stove embodying my invention.

A represents a vapor-stove of any suitable construction; B, the reservoir, and C the pipe which connects the reservoir and the burners D in the usual manner. Connected with the reservoir is the cylinder G, in which is placed the tightly-fitting piston I. The piston-rod J is fastened to the cover L of the reservoir in such a manner that when the cover is raised for the purpose of filling the reservoir the piston will be raised upward in its cylinder, so as to force back into the reservoir all the oil in the cylinder above it, and thus form a vacuum in the supply-pipe, which vacuum will cause a suction upon the burners, for the purpose of forcibly drawing away from them the oil in the vertical pipes L leading to them, and thus instantly extinguishing the flames. In the lower part of the cylinder, above the lowest point to which the piston sinks when in position, is made a small hole, O, through which the oil flows into the enlarged part P of the pipe, and thence on down to the burners. Sufficient oil flows through this small opening to keep all of the burners supplied, and the only source of supply to the burners is through this small opening.

I do not limit myself to the precise location of the piston and cylinder, for they will operate equally as well when placed below the level of the burners as when placed above them. If so desired, a coil or other suitable spring may be secured to the bottom of the piston, so as to draw it back into position as soon as the piston-rod is released. One great source of danger with vapor-burners is that people, not knowing the danger, will attempt to fill the reservoir while the burners are lighted. Explosions and accidents are almost sure to happen, and hence the object of my invention is to extinguish the flames in the very act of raising the cover, and thus make accidents impossible.

Previous to my invention, in this class of vapor-stoves the reservoir was provided with a moving plunger of somewhat less diameter than the interior diameter of the reservoir, so that the plunger would work loosely therein, and allow the oil or gasoline to pass in its course between the interior side of the reservoir and exterior of the plunger. When this plunger is raised it simply acts to displace a portion of the oil in the reservoir, and allows it to settle at the bottom below the level of the pipe which conveys the oil to the burners. As the oil sinks to the lower part of the reservoir the oil simply flows away, by its own gravity, from the burners, provided the minute orifices in the burners are not clogged and will allow the air to pass through them, so as to force the oil and vapor away from the burners. It is not sufficient to merely extinguish the flames at the burners, for if the gas from the burners is allowed to escape the gas mingles with the air and an explosive mixture is formed, which is more dangerous than allowing the burners to remain lighted while the reservoir is being filled. To remove all danger it is necessary to both extinguish the flames and prevent the escape of gas into the room, and in order to do this the oil and gas must be drawn away from the heated pipes, so as to stop the generation of gas, and be held by a positive suction which will hold them back in the pipe until the burners are again ready to be lighted. This can only be done where a direct, positive, and forcible suction is produced upon all the burners. Another great advantage gained by the use of a piston consists in that when the piston is forced downward in the cylinder after the reservoir has been filled it forces the gas or a small part of the oil through the gas-orifices with sufficient force to clean away the sediment which forms inside of the burners and clogs their actions. Old burners which have become inoperative from this source can be cleaned out and be as good as new by a few movements of the piston.

Having thus described my invention, I claim—

1. The combination, with a vapor-burner, oil-reservoir, and the supply-pipe thereof, of a tightly-fitting piston, adapted to operate substantially as and for the purpose specified.

2. The combination, with a vapor-burner and an oil-reservoir, of a supply-pipe, a piston, the piston-rod, and the cover for the reservoir, whereby the removal of the cover of the reservoir will cause the burner or burners to be extinguished, substantially as specified.

3. The combination of the oil-reservoir, a cylinder having a small opening through its lower end, a piston, and an enlargement in the supply-pipe around the lower end of the cylinder, substantially as specified.

In testimony whereof I affix my signature in presence of two witnesses.

ZEBULON DAVIS.

Witnesses:
W. B. BLAKE,
L. D. COX.